Sept. 23, 1969  R. J. KEEGAN  3,468,476
SALES CONTROL INDICATOR
Filed June 6, 1967
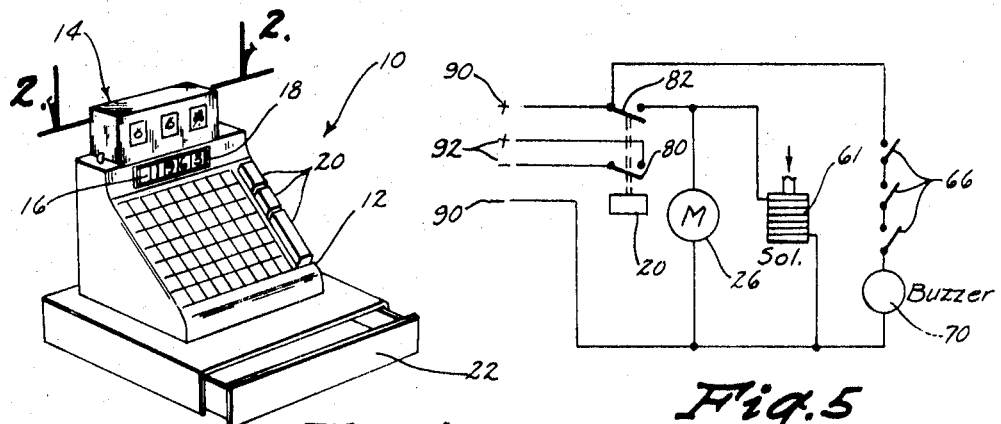
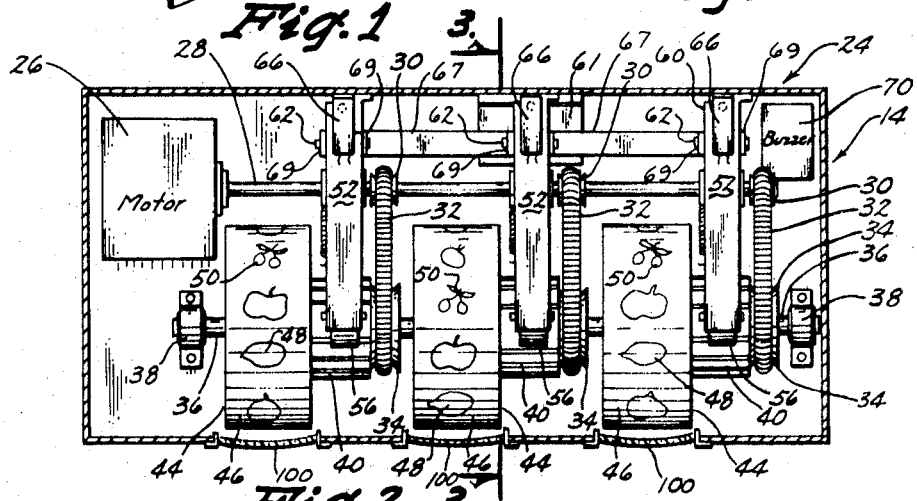
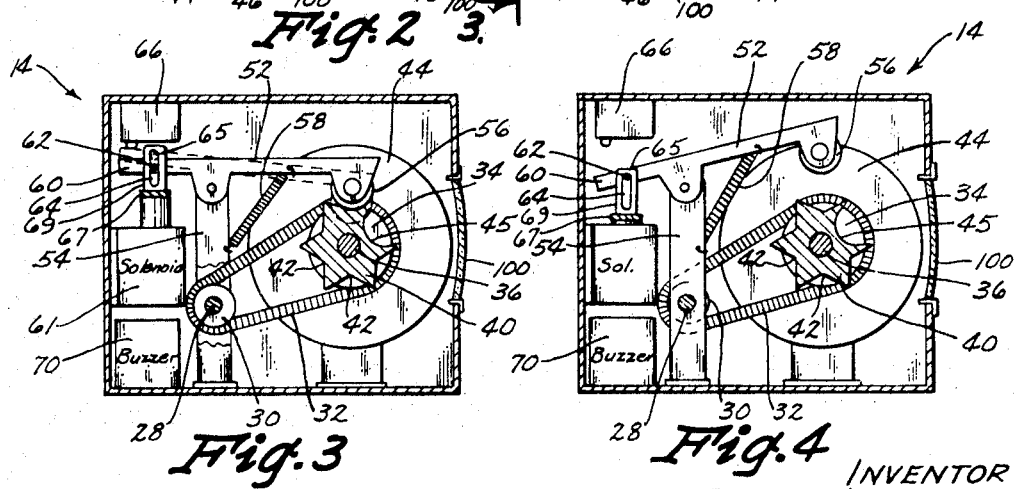
INVENTOR
ROBERT J. KEEGAN
BY
Dick, Zarley, McKee & Thomte
ATTORNEYS

United States Patent Office 3,468,476
Patented Sept. 23, 1969

3,468,476
SALES CONTROL INDICATOR
Robert J. Keegan, 1761 W. 12th St.,
Davenport, Iowa 52804
Filed June 6, 1967, Ser. No. 643,966
Int. Cl. G07g 1/04
U.S. Cl. 235—23                          10 Claims

ABSTRACT OF THE DISCLOSURE

A cash register having a sales control means actuated by operation of the cash register which is connected to a signalling device which operates a series of movable indicia which when stopped at a predetermined position exposes a predetermined indicia pattern and may case an audio unit to be activated.

---

In bars and taverns there is a very definite problem of maintaining security over the cash flow from the customer to the cash register. Several people may be using the cash register and there frequently is no positive check that all monies received from customers are in fact deposited in the cash register. The overhead of bars, taverns and restaurants and the like includes a substantial amount for employee misappropriation of monies.

It is the object of this invention to provide a check against the employees of a business misappropriating funds of the business which are to be deposited in the firm's cash register.

This invention involves placing a signalling device in combination with the cash register wherein the signalling device will arbitrarily at random register a predetermined pattern of indicia which will indicate to the customer that he is a winner and as desired may be rewarded by for example the "house" paying for the drink or the like that has been served him. An alarm audio unit may also be actuated at the time the movable indicia members are moved to the winning predetermined pattern. A winning indicia pattern could include three lemons for example exposed in three windows of the signaling device. The movable indicia members will be operated each time the cash register is operated and will consequently draw attention to the amount rung up on the cash register and will cause the customer to notice if the correct amount has been rung up on the cash register. The customer is expected to watch the signalling device to see if the winning indicia pattern appears. If the customer cannot see the signalling device, he will hear the audio unit upon being activated. The employees of the firm cannot afford to take the chance of ringing up a lesser amount than the actual customer purchase since the signalling device may stop on the winning combination and the customer will expect a refund of the amount he has paid and this should correspond to the amount that has been rung up on the cash register.

It is seen that this invention will provide an incentive for customers to buy more of the firm's products; it will encourage honesty among the employees of the firm; carelessness in record keeping will be avoided and accuracy will result; customers are encouraged to buy layer dollar amounts because of the chance that their purchase may be free; the signalling device will be a conversational piece in and out of the business establishment; and the device satisfies the human nature psychological need for gambling.

These and other features and advantages of this invention will become readily apparent to those skilled in the art upon reference to the following description when taken into consideration with the accompanying drawings; wherein:

FIG. 1 is a perspective view of the cash register with the signalling device mounted thereon;

FIG. 2 is a cross-sectional view taken along line 2—2 of FIG. 1;

FIG. 3 is a cross-sectional view taken along line 3—3 in FIG. 2;

FIG. 4 is a cross-sectional view similar to FIG. 3 but showing the signalling device in its operational condition whereby the indicia members are free to rotate; and FIG. 5 is an electrical schematic drawing of the electrical circuitry for operating the cash register and the signalling device.

In FIG. 1 the cash register-signalling device is referred to generally by the reference numeral 10 and includes a cash register 12 with the signalling device 14 mounted thereon. A window 16 is provided on the cash register to expose the dollar amount 18 of sales rung up on the cash register. A series of operating buttons 20 are conventionally provided on the cash register. The cash register also includes a money drawer 22.

In FIG. 3 it is seen that the signalling device 14 includes a housing 24 in which a motor 26 is mounted and drives a shaft 28 connected to a trio of sheaves 30 which in turn are connected through spring belts 32 to a second trio of larger sheaves 34 mounted on a common shaft 36 supported by bearing mounts 38 at its opposite ends.

Each of the sheaves 34 turn with star-shaped sprockets 40 having a series of indentations or notches 42. A notch 45 is provided which is cut deeper into the sprocket wheel 40. Next to the sprocket wheel 40 is a drum 44 having indicia 46 on its periphery and includes lemons 48, cherries 50, etc.

Associated with each of the sprockets 40 is a lever arm 52 pivotally intermediate its ends on a support standard 54 with a roller 56 on its end adjacent the sprocket 40 for mating engagement with the notches 42 and 45. A spring 58 normally biases the lever 52 downwardly for the roller 56 to engage the sprocket wheel 40. The opposite end 60 of the center lever 52 is connected to a solenoid 61 through a pin 62 movable in a vertical slot 64 formed in a pair of plate elements 65 on the solenoid 61. A laterally extending connecting element 67 is connected to the solenoid and to two pairs of upstanding brackets 69 which are connected by a pin 62 to each of the outer two arms 52. A switch 66 is mounted directly above each of the lever ends 60 and are actuated thereby when the levers move to their dash line positions as shown in FIG. 3. The switches 66 are only actuated when the roller 56 are received in the deep notches 45. At other times when the rollers 56 engage the other smaller notches 42 the lever ends 60 move upwardly only to be solid line position of FIG. 3 short of the switch 66.

Referring now to the electrical schematic drawing in FIG. 5 it is seen that the switches 66 are connected in series with a buzzer 70 which is also mounted in the housing 24. The motor 26 and the solenoid 61 are operated together when a switch 80 is closed within the cash register by for example one of the tabulator buttons 20 such as the total button. Additionally an auxiliary switch 82 is simultaneously closed by the tabular button 20. The signalling device 14 need only be operated for a short time during the total cycle of operation of the cash register, but the operation of the signalling device must occur during the operation of the cash register and be controlled by it and thus the control switch 80 operated by the tabular button 20 is shown as one suitable arrangement. Power leads 90 and 92 for the signalling device and cash register respectively are provided separately such that a minimum alteration of the cash register wiring will be necessary.

The indicia on the drums 44 is exposed through adjacent windows 100 in the housing 24.

Thus it is seen that in operation that use of the cash register to any extent closing the switch 80 will in turn close the signalling device switch 82 and cause the motor 26 to operate thereby turning the drums 44 with the indicia 46 on their peripheries. At the same moment, the solenoid 61 will move the levers 52 upwardly thereby lifting the rollers 56 out of engagement with the sprockets 40 which permits rotation of the drums 46. Upon completion of the operation of the cash register 12 the internal switch 80 therein will be opened and the signalling device switch 82 will also be open thereby shutting off the motor 26 and the solenoid 61. The drums 44 will continue to rotate by virtue of their momentum and the spring belts 32 will slip on the sheaves 34 since the motor may not be operating at the same speed as the drums. Similarly, since there is inherent in the spring belts 32 slippage the drums will not rotate at the same speed and accordingly the same indicia will not appear in the windows 100 each time the signalling device is operated. When the circuit containing the motor 26 and the solenoid 61 has been opened the lever arms 52 are moved downwardly for the rollers 56 to engage the sprockets 40 and if by chance the rollers for each sprocket engage the deep notch 45 the switches 66 will all be closed and the buzzer 70 will be activated. This will mean that the winning predetermined pattern of indicia on the drums appears in the windows 100. This could be three lemons for example. Accordingly visual and audio signalling is provided when there is a winner. If only one or two and not all of the deep notches 45 are engaged by the lever roller portions 56 the buzzer circuit will not be closed since all of the switches 66 will not be closed.

Some changes may be made in the construction and arrangement of my Sales Control Indicator without departing from the real spirit and purpose of my invention.

I claim:
1. In combination,
    a cash register having an indicator for registering the amount of a transaction, said indicator being exposed externally of said cash register, and means for actuating said indicator, and control means associated with said means for actuating said indicator,
    a signalling device associated with said cash register and being connected to said control associated with said means for actuating said indicator,
    said signalling means includes a plurality of windows, an indicia member having indicia thereon movably disposed and exposed behind each window, means for moving said indicia members, said selective means includes stop means for stopping movement of said indicia members,
    said stop means includes a substantially star-shaped rotatable sprocket for each movable indicia member, a lever arm having a portion adapted to move into engagement with each of said star-shaped sprockets, said portions being normally in engagement with said sprockets to limit rotation thereof, means for moving said lever arms out of engagement with said sprockets and being operatively connected to said control means on said cash register, means for moving said portions of said lever arms into engagement with said sprockets upon said control means and said means for moving said indicia members being deactivated.

2. The structure of claim 1 wherein said signalling device includes an audio sgnalling unit operably connected to said indicia members, means for actuating said audio signalling unit upon said indicia members being stopped with a predetermined pattern of indicia exposed in said respective windows.

3. The structure of claim 1 wherein said signalling device includes an audio unit which is operatively connected in series with each of said lever arms and sprockets, said sprockets each having a series of notches around its periphery and including one notch cut deeper than the other notches whereby said lever arm is moved to a signal unit actuating position and when each of said plurality of arms are moved to said signal unit actuating position said signal unit is activated.

4. The structure of claim 3 wherein said indicia on each of said movable indicia are so arranged with respect to said one notch that said portion on said lever engages said one notch when a predetermined indicia pattern appears in said windows on said movable indicia members.

5. The structure of claim 4 wherein said movable indicia members continue to move by momentum after said control means has deactivated said means for moving them and until said portions of said levers engage a notch on each of said sprockets.

6. The structure of claim 5 wherein said means for moving said lever arms out of engagement with said sprockets includes a solenoid connected thereto.

7. The structure of claim 6 wherein said indicia members are circular and move by rotation, and said lever arms are pivotally mounted intermediate their ends, said portion for engaging said sprocket notches being on one end and the opposite end being connected to said solenoid, said signalling unit is operatively connected to said lever arms through switches mounted on the opposite side of said lever arms from said sprockets and adjacent to their ends connected to said solenoid whereby when each of said portions on said lever arms move into said notches being deeper said opposite ends of said lever arms pivot into actuating engagement with said switches for actuation of said signalling unit.

8. In combination,
    a cash register having an indicator for registering the amount of a transaction, said indicator being exposed externally of said cash register, and actuating means for activating said indicator to read a programmed message indicating the amount of said transation,
    a second indicator exposed externally of said cash register and having an actuating means connected to said first mentioned actuating means for operating said second indicator, said second indicator freely operable upon being actuated by said second actuating means and said second actuation means only arbitrarily controlling the reading on said second indicator upon said second indicator being stopped whereby the reading on said second indicator is the result of chance,
    an alarm means coupled to said second indicator for being activated only when said second indicator through chance stops at a predetermined reading.

9. The structure of claim 8 wherein said second indicator comprises a plurality of rotatable drums having indicia thereon exposed through a window in a housing for said second indicator and said predetermined reading on said second indicator being a predetermned pattern of indicia on said drums exposed through sad windows.

10. The structure of claim 9 wherein said rotation of said drums is stopped by stop means controlled by said second indicator actuation means for said drums to rotate freely until said second actuation means is deactivated and thereupon said stop means is activated to stop said rotating drums.

References Cited

UNITED STATES PATENTS

Re. 10,885    11/1887    Maxwell _____ 235—128
Re. 12,304     1/1905    Cottrill _____ 235—128

(Other references on following page)

UNITED STATES PATENTS

| | | | |
|---|---|---|---|
| 1,217,753 | 2/1917 | Groshell | 235—128 |
| 1,756,861 | 4/1930 | Hoke | 194—2 |
| 1,912,992 | 6/1933 | Mills | 194—2 |
| 1,964,353 | 6/1934 | Hodos | 235—128 |
| 2,007,259 | 7/1935 | Smith | 273—142 |
| 2,118,696 | 5/1938 | Bonetti | 40—53 |
| 2,152,599 | 3/1939 | Mills | 273—143 |
| 2,276,632 | 3/1942 | Stelter et al. | 235—128 |

RICHARD B. WILKINSON, Primary Examiner

S. A. WAL, Assistant Examiner

U.S. Cl. X.R.

194—2